June 19, 1934.  G. C. TROTTER  1,963,536
SELF LOCKING SCREW
Filed July 20, 1931
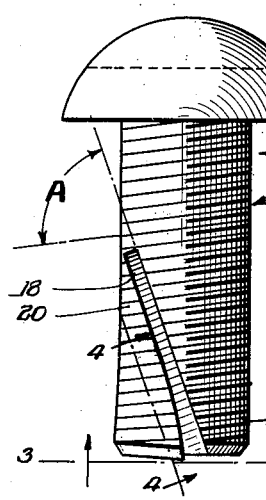
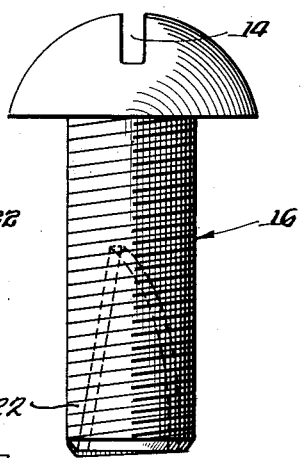
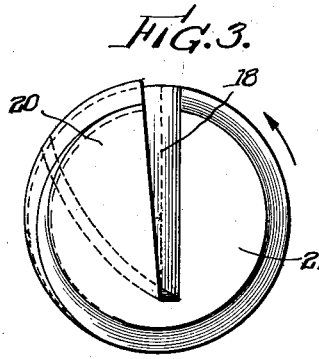
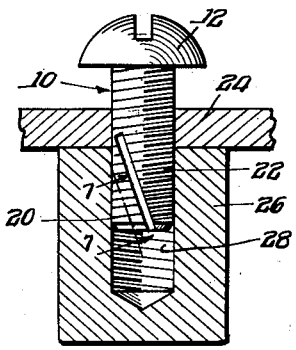
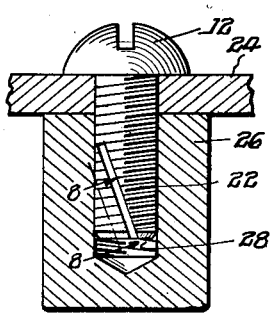
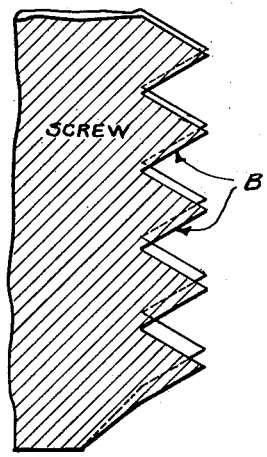
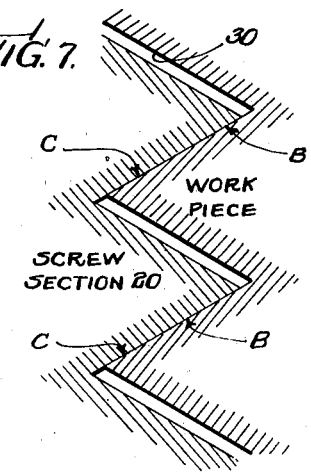
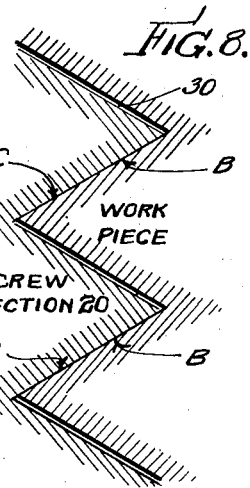
Inventor:
George C. Trotter,
By Cheeney, Cox & Moore attys.

Patented June 19, 1934

1,963,536

UNITED STATES PATENT OFFICE 1,963,536

SELF-LOCKING SCREW

George C. Trotter, Chicago, Ill., assignor, by mesne assignments, to Illinois Tool Works, Chicago, Ill., a corporation of Illinois Application July 20, 1931, Serial No. 551,905

5 Claims. (Cl. 151—14)

My invention relates generally to self-locking screws, and particularly to those of the machine screw type which are adapted to secure or clamp one work piece against the surface of another.

An object of my invention is to provide a screw as above set forth, which is configurated in a novel manner so as to render the same effectively self-locking when applied to the threaded aperture of the work piece.

Another object of my present invention is to provide a screw having a threaded body which is so configurated that, when said screw is tightened within a companion threaded aperture, a section of said screw body will serve to resiliently bear against the companion threads in the aperture and thereby effectively counteract any tendency to impart retrograde movement to the screw.

Still another object of my invention is to provide a self-locking screw as above set forth, in which a section of the screw body, when applied to the threaded aperture of a work piece, has a normal tendency to bear downwardly against the companion threads in the work piece and thereby secure the screw against retrograde movement.

A further object of my invention is to provide a self-locking screw as set forth above, having its body so configurated that, when the head of the screw is clamped against a work piece, the locking effectiveness of a yieldable section of the screw body is increased.

Still more specifically, my invention contemplates the provision of an improved self-locking screw having a recess extending partially through the screw and extending obliquely with respect to the screw axis, one of the sections presented on each side of said recess being normally displaced laterally with respect to the cylindrical confines of the screw body, whereby to render the same self-locking when the screw is applied to the threaded aperture of a work piece.

A still further object is to provide a self-locking screw as above set forth, in which the recess in the body portion is not only disposed obliquely with respect to the screw axis, but is also obliquely disposed with respect to the thread helix, whereby to increase the locking effectiveness of a yieldable section of said screw positioned on one side of the recess.

The foregoing and numerous other objects and advantages will be more apparent from the following detailed description when considered in connection with the accompanying drawing, wherein—

Figure 1 is an elevational view of a screw which is representative of one embodiment of my invention;

Figure 2 also discloses an elevation of the screw, as viewed from the right of Figure 1;

Figure 3 is a view of the underside of the screw in Figure 1, said view being taken substantially along the line 3—3 of Figure 1;

Figure 4 is an enlarged fragmentary sectional view of the yieldable section of the screw taken substantially along the line 4—4 of Figure 1;

Figure 5 discloses the screw during its initial application to the work piece;

Figure 6 discloses said screw with the head thereof clamped against the outer surface of a work piece;

Figure 7 is an enlarged diagrammatic illustration of the screw and work piece in cross section along the line 7—7 of Figure 5;

Figure 8 is a similar diagrammatic sectional view to disclose the appearance of the companion threads in the work piece and screw when viewed along the line 8—8 of Figure 6; and Figure 9 is a fragmentary perspective view of the screw body to more clearly disclose the locking thread edges on the yieldable screw section.

Referring now to the drawing more in detail wherein like numerals have been employed to designate similar parts throughout the various figures, it will be seen that one embodiment of my invention includes a screw designated generally by the numeral 10. This screw includes the usual head 12 having a transverse slot 14 and a threaded body 16 extending axially of the head. A recess or slot 18 is provided within the body 16 and extends transversely of and not completely through said body. Attention is also directed to the fact that this slot 18 is not only obliquely disposed with respect to the axis of the screw, but is also angularly or obliquely disposed with respect to the helix of the threads in the screw. This angular disposition of the slot or slit 18 may be best observed from the disclosure in Figure 1.

It will be noted that the slot or recess 18 divides the screw body 16 into a pair of screw sections 20 and 22. It will also be seen that the screw section 20 is positioned on the advancing side of the screw when compared with the section 22 if the screw is considered as rotating in the direction indicated by the arrow in Figure 3. The screw section 20 is normally deflected laterally of its companion section 22 so as to position a portion of the section 20 out of the normal cylindrical confines of the screw body, as clearly shown in Figure 3. In other words, the section 20 is sprung away from the screw section 22 about an axis parallel with the slot 18. The lateral deflection of the section 20 as described above positions the threads thereof in the manner shown in Figure 4. In this figure it will be seen that the lateral deflection of the screw section 20 not only causes the periphery of said section to be swung outwardly beyond the normal cylindrical confines of the screw body, but also imparts an axial movement which disturbs the alinement of the threads in the sections 20 and 22. If the slot 18 were disposed at right angles with respect to the thread helices as described and claimed in my copending application, Serial No. 551,904, filed of even date herewith, the lateral deflection of the section would not cause any misalinement of the thread portions in the companion screw sections. However, it should be noted that the slot 18 is not disposed at right angles with respect to the thread helices, as evidenced from the angle designated by the letter A in Figure 1, which is less than ninety degrees.

Assume now that the screw 10 is applied to a pair of work pieces 24 and 26 for the purpose of securing the work piece 24 against the adjacent surface of the work piece 26. The work piece 26 is provided with a threaded aperture 28 for receiving the screw and, as the screw enters said aperture, the section 20 is forced inwardly or toward its companion section 22 so as to conform to the normal cylindrical shape of the threaded aperture 28. Obviously as the screw is tightened within the threaded aperture, the inherent resiliency or spring of the screw section 20 causes said section to be urged outwardly and axially. That is to say, when the screw occupies the position shown in Figure 5, the screw section 20 has a normal tendency to return to the position shown in Figure 1 and is counteracted in this tendency by the threads in the aperture 28.

Particular attention is directed to the enlarged diagrammatic representation in Figure 7, wherein I have endeavored to disclose the manner in which the lower surface of each thread of the screw designated generally by the letter B, bears downwardly and outwardly against the companion upper surface C of the threads in the work. It may be assumed that a certain amount of clearance is present between the threads of the screw and the threads in the work piece 26, and this clearance has been indicated by the space 30 in Figure 7. Obviously this space has been somewhat magnified or exaggerated in Figure 7 merely for the purpose of more clearly illustrating the locking action which takes place when the screw occupies the position shown in Figure 5. It should be apparent that if a force is applied to the screw 10 which tends to impart retrograde rotation thereto, the frictional resistance set up between the surfaces B and C will serve to effectively oppose such a tendency. In other words, the screw need not be completely tightened within the work piece in order to render effective the self-locking action thereof. Not only do the surfaces B of the threads in the screw section 20 frictionally contact with the companion surfaces C of the threads in the work piece so as to counteract any tendency to loosen the screw, but also lowermost edges D, Figure 9, of each thread in the screw section 20 which border the slot 18, have a tendency to dig into the surfaces C of the work piece and thereby enhance the locking effectiveness of the screw.

Thus far I have described the locking action of the screw before the head 12 is tightened against the work piece 24. As said head is moved to the position shown in Figure 6 and tightened against the work piece 24, there is a tendency to impart relative axial movement between the work piece 26 and the screw body which permits the threads in the screw section 20 to take up the play or clearance between the threads. In other words, when the screw head is clamped against the work and causes the above mentioned slight relative movement between the screw and the work piece, the inherent resiliency or spring in the screw section 20 causes it to automatically swing outwardly and downwardly to take up any clearance between the threads of the screw and the work and thereby increase the frictional contact between the surfaces B and C. In Figure 8 I have endeavored to illustrate semi-diagrammatically the manner in which the threads of the screw section 20 shift with respect to the threads of the work piece so as to take up or reduce the clearance 30. In view of the fact that this clearance between the threads is so small, it is difficult to disclose the locking action of the screw without somewhat exaggerating the clearances. Therefore, it should be understood that the disclosures in Figures 7 and 8 are merely illustrative representations and do not purport to disclose the actual size of clearances, etc. From the foregoing it will be clear, however, that when the screw head is tightened against the work, the locking effectiveness of the screw within the work is materially increased. In fact, in some instances it has been found that when a hardened screw constructed in accordance with the teachings of my invention is employed and a backing-off force is applied thereto after the head thereof has been clamped against a work piece, said head will shear off the body without causing any retrograde movement of the screw body. That is to say, the locking action exerted by the screw section 20 is sufficient to practically secure the screw against any possibility of loosening either through inadvertence or through the willful application of force.

From the foregoing it will be apparent that my invention contemplates the provision of a self-locking screw which is extremely simple in construction and efficient in operation. Screws equipped with threads having a standard lead and pitch may be employed, and this fact in itself renders the invention adaptable for a wide range of uses. In fact, the invention may be employed in instances where an adjustable screw is required. Under such conditions the locking action of the screw section 20 as described in connection with Figure 5, will permit retrograde movement of the screw if sufficient force is applied thereto, but will prevent any inadvertent turning of the screw in either direction. Thus the screw may be adjustably positioned within the aperture 28 and will remain in such adjusted position until a turning force is actually applied to the screw. By having the slot 18 disposed at the angle disclosed in the drawing, or, in other words, by having the angle A of Figure 1 acute, a misalinement of the threads in the sections 20 and 22 takes place when the section 20 is sprung outwardly to the position shown in Figures 1 to 4 inclusive. Thus by shifting the screw section 20 about an axis which extends in substantial parallelism with the slot 18, the thread portions of said section adjacent the slot are not only shifted out of the normal cylindrical confines of the screw body, but are also subjected to a movement axially of the screw so as to position threads of the section 20 out of alinement with respect to the threads in the section 22, as clearly shown in Figure 4.

Having thus described my invention, what I claim as new and desire to secure by Letters Patent is:

1. A screw including a threaded body having a slot extending transversely of the body obliquely with respect to the axis of the screw so as to present a pair of screw sections on opposite sides of the slot at the entering end of the screw, one of said sections being sprung away from the other section so as to position the threads in one section out of alinement with respect to the threads in the other section.

2. A screw including a body portion, a section of said body being sprung outwardly about an axis obliquely disposed with respect to the axis of the screw, whereby to render the same self-locking when applied to the threaded aperture of a work piece.

3. A screw including a threaded body portion, said body portion including a pair of screw sections, one of said sections being shifted laterally and axially with respect to the other section, whereby to render said screw self-locking when applied to the threaded aperture of a work piece.

4. A screw including a threaded body portion having a slot extending transversely thereof so as to divide the body into a pair of spaced screw sections, the plane of said slot being oblique with respect to the axis of the screw, one of said sections being sprung laterally and axially with respect to the other section, whereby to render the screw self-locking when applied to the threaded aperture of a work piece.

5. A screw including a threaded body having a slot extending transversely of the body obliquely with respect to the axis of the screw so as to present a pair of screw sections on opposite sides of the slot, one of said sections being sprung diametrically away from the other section so as to position the threads in one section out of alinement with respect to the threads in the other section, and a head on said screw adapted to be tightened against the surface of a work piece.

GEORGE C. TROTTER.